United States Patent [19]

Knoop et al.

[11] 4,376,963
[45] Mar. 15, 1983

[54] COMPOSITE MAGNETIC RECORDING DISK

[75] Inventors: Jack P. Knoop, San Jose; Joel R. Weiss; James C. Uy, both of Morgan Hill, all of Calif.

[73] Assignee: International Business Machines Corporation, Armonk, N.Y.

[21] Appl. No.: 218,339

[22] Filed: Dec. 19, 1980

[51] Int. Cl.³ .............................................. G11B 5/82
[52] U.S. Cl. .................................... 360/135; 427/131
[58] Field of Search ........................ 360/135, 131–133, 360/97–99, 86; 427/129–132; 428/935, 687

[56] References Cited

U.S. PATENT DOCUMENTS 3,130,110  4/1964  Schmidt ................................ 166/32
3,671,351  6/1972  Ties .................................. 360/135 X
3,681,225  8/1972  Genma et al. ................... 428/935 X
3,761,333  9/1973  Kleinbeck et al. .................... 156/64

OTHER PUBLICATIONS

Composite Magnetic Disk Substrate" by Hinkel et al., IBM/TDB, vol. 24, No. 9, Feb. 1982.

Primary Examiner—John H. Wolff
Attorney, Agent, or Firm—Walter J. Madden, Jr.

[57] ABSTRACT

A composite structure for magnetic recording includes a core member of polymeric material to which is bonded at least one silicon disk having a magnetic recording material on its outer surface. The silicon disk surface provides optimal flatness and smoothness characteristics for a magnetic recording substrate, while the polymeric core member provides strength to the structure.

7 Claims, 2 Drawing Figures

COMPOSITE MAGNETIC RECORDING DISK

TECHNICAL FIELD

This invention relates in general to magnetic recording disks, and relates more particularly to such disks formed as a composite structure.

BACKGROUND ART

In magnetic recording, the use of disks having either particulate or thin film magnetic coatings on aluminum substrates, is well known. Each of these types of coatings has problems associated therewith which render them less than totally desirable, particularly for extremely thin coatings which are required for high bit density recording patterns being used now and in the future.

Particulate magnetic coatings on aluminum substrates, especially in extremely thin layers, often exhibit limited durability with respect to contact with the magnetic transducer associated with the disk. Thin film magnetic disks, usually produced by sputtering, evaporation or electroplating of a magnetic coating on an aluminum substrate, generally provide magnetic coatings which are thinner than those available with particulate coatings. However, thin film disks often exhibit significant corrosion problems, primarily because of the reaction between the metal substrate, which has been required to be aluminum because of weight considerations, and the deposited thin film layer. Such disks have required the deposition of one or more protective layers between the substrate and the thin film magnetic layer and over the thin film layer. Understandably, the requirement for these protective layers has added significantly to the cost of the thin film disk. Additionally, both particulate and thin film magnetic disks usually have employed a substrate of substantial thickness relative to the coating thickness, thereby adding appreciably to the weight of an assembly which includes several of such disks.

Since thin films of metals or polymers typically replicate the substrate surface, the necessity to try to achieve surface perfection (i.e. asperity-free, flat, etc., to prevent amplitude modulation and head crashes) in aluminum substrates has been a traditional problem. While improvements in substrate polishing and coatings have been made, future major performance improvements will rely on enhancements of the substrate surface.

PRIOR ART

In accordance with the present invention, a composite magnetic recording disk is formed using a silicon member as a substrate for the magnetic recording material, the silicon substrate being reinforced or strengthened by a polymeric molding material.

There is a substantial amount of art showing various composite recording disk structures. Representative patents are:

U.S. Pat. No. 3,761,333, Kleinback et al, shows a sandwich core for a magnetic disk employing plastic and fiber glass reinforcement.

U.S. Pat. No. 3,681,225, Genma et al, shows a magnetic disk with a synthetic resin core on which a magnetic layer is placed by electrodeposition.

U.S. Pat. No. 3,310,110, Schmidt, shows a magnetic disk with a molded plastic core to which a layer of film and magnetic material is bonded.

However, none of these references show the combination of a silicon substrate bonded to a polymer which may, for dynamic damping, strength and matching coefficient of expansion reasons, contain a fiber reinforcement such as graphite or fiberglass dispersed in a radial or random pattern. The thermal expansion coefficient of the polymeric material is matched to that of the silicon substrate material.

THE INVENTION

The present invention is directed to a recording disk structure comprising one or two silicon substrates mounted in a core of polymeric molding material which may contain fiber reinforcements. The silicon substrate is provided with a magnetic coating, either thin film or particulate, to produce a magnetic recording surface. Silicon is available in disk form at reasonable cost as a result of silicon wafer technology developed in the semiconductor industry, and represents an ideal substrate surface in terms of smoothness, flatness and weight. The fiber reinforced molding material compensates for the lack of strength in the silicon which would otherwise prevent its use as a substrate.

In the preferred embodiment of the invention, the polymeric core is formed of an injection molded fiber reinforced polymeric material. One or two silicon wafers are then bonded to the molded core member, these silicon wafers forming the substrate for a magnetic coating material which may be deposited on the wafer either before or after bonding of the wafer to the polymeric core. As an alternative to injection molding, well known compression molding techniques may be employed.

BEST MODE EMBODIMENT AND INDUSTRIAL APPLICABILITY

Figure 1:
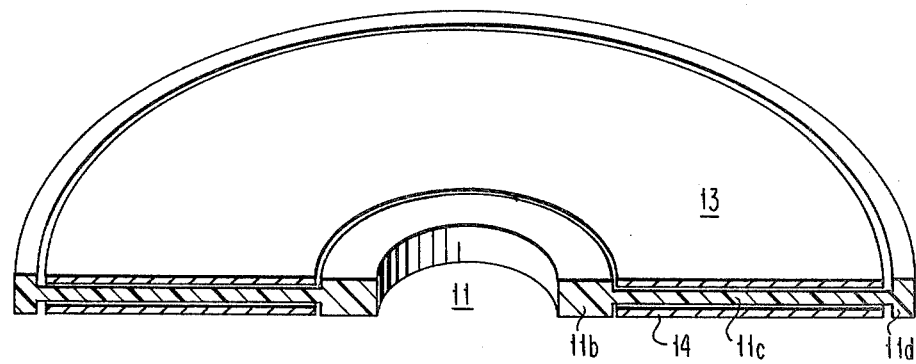
FIG. 1 is a perspective view, partly in section, showing a composite disk formed by first fabricating a molded core and then applying silicon disks to the top and bottom surfaces thereof.

Referring to FIG. 1, reference numeral 11 designates a molded core structure, made for example of a polymer material containing fiber reinforcement. The polymeric material used should have high tensile strength and low elongation to enable it to withstand forces generated at high rotational speeds, up to 6000 rpm. The material should also have high rigidity to provide proper impact resistance. We have found that the class of polymeric materials known as polyphenylene sulfides are well suited for purposes of the present invention. Within the general class of polyphenylene sulfides, the following materials are particularly suitable:

RX-1834-Manufactured by International Polymer Corporation.

J-1300/CF/20-Manufactured by the Fiberfil subsidiary of Dart Industries.

OC-1006-Manufactured by LNP Corporation.

Core 11 is formed with a central opening therein, and has a central section 11b of one thickness. From central section 11b, the core steps down in thickness through section 11c and is provided with a thicker lip section 11d around its periphery.

Silicon disk members 13, 14 are mounted on core 11 as shown and secured thereto by suitable means such as by a fast core epoxy 15. The silicon disks 13, 14 are preferably obtained from silicon cylinders or "boules" as grown for use in the semiconductor industry. The silicon wafer itself is of standard semiconductor grade where flatness, smoothness, crystallographic orientation, freedom of scratching, orange peel, haze, dimples, and chips can be specified along with electrical conductivity. Five inch diameter silicon wafers are available today in any thickness and six inch diameter wafers can be special ordered. The disks may be cut from such a cylinder or boule and be provided with central openings, such as by laser cutting, to enable them to be mounted on central section 11b or core 11. A magnetic layer, either of the particulate type, or a thin film layer, is provided on the outer surfaces of disks 13, 14 to form magnetic recording surfaces. This magnetic layer may be applied either before or after securing the disks to core member 11.

The core structure of FIG. 1 provides increased strength for silicon disks 13, 14, and the provision of lip section 11d provides edge protection to the disks. Further, central section 11b provides a solid surface for clamping the structure, so that no clamping forces need to be applied to the relatively fragile silicon disks themselves.

Where a number of such structures are to be clamped together, to minimize the clamping force, simplify the clamping device, lighten the overall spindle construction, and prevent slippage for both single and stacked disks, mating tabs and slots or key and keyways can be incorporated into the mold design.

By varying the amount and type of fiber loading fraction and binder materials used in making core 11, a suitable balance can be obtained between the thermal expansion coefficient of the core and the recording media, and the stiffness of the composite structure.

The structure of FIG. 1 may be used as shown to provide a two surface recording member by clamping the device at central section 11b to a suitable drive motor to rotate disks 13, 14 past suitable electromagnetic transducers which are movable radially of the disks to cooperate with different concentric recording tracks on the disks, as is well known in the art.

Figure 2:
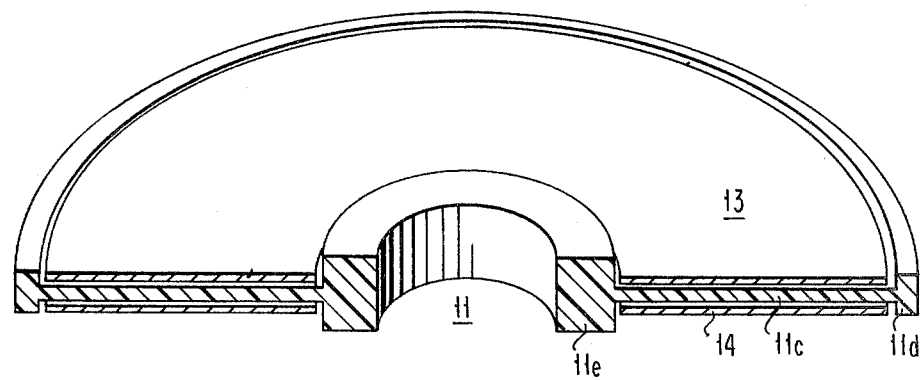
FIG. 2 shows a modification of the structure of FIG. 1, in which the core is provided with raised extensions to facilitate stacking of a number of such devices.

FIG. 2 illustrates a modification of the structure of FIG. 1, core 11 in FIG. 2 having a central section 11e which extends significantly above and below the surfaces of disks 13, 14. This approach would be used where a number of such structures are to be stacked together to form a recording device similar to a magnetic disk pack. The extension of central portion 11e would provide sufficient clearance between opposed surfaces of the stacked disks to permit insertion and movement of transducers relative to the opposed recording disk surfaces. As discussed above, keys and keyways or tabs and slots are provided on the faces of central section 11e to minimize the clamping forces required to hold the structure and to prevent rotational slippage of one stacked structure relative to an adjacent structure.

As an example of a magnetic recording structure made in accordance with the present invention, a core structure similar to that shown in FIG. 1 was molded using a fiber reinforced polymer material as described above. The core had an outer diameter of 5.25 inches and the central opening therein had a diameter of 1.375 inches. The height of central section 11b and lip portion 11d was 0.1 inches. The silicon disks were cut from a silicon cylinder or boule having a diameter of 5.0 inches, the disks having a thickness of 0.024 inches. One surface of each disk was provided with a thin film of magnetic material using sputtering techniques. A laser was used to cut central openings in the disks and they were then bonded to core 11, the magnetic surfaces facing outward from core 11. This recording structure was then rotated at a speed of 3624 rpm and operated in a stable manner.

We claim:

1. A substrate for a magnetic recording disk structure, comprising,
   a rigid silicon disk having a thickness no greater than 0.025 inches,
   an annular shaped core member formed of a polymeric material, said polymeric material having high rigidity and tensile strength and low elongation, bonding means for bonding one surface of said silicon disk to said core member,
   the other surface of said silicon disk being adapted to receive a magnetic recording material to form a magnetic recording member.

2. Apparatus in accordance with claim 1, in which said polymeric material contains a fiber reinforcement material.

3. Apparatus in accordance with claim 1, in which said core member has an annular recess therein to receive said silicon disk, the walls of said recess serving to protect the relatively fragile silicon disk.

4. Apparatus in accordance with claim 1, in which said structure includes two of said silicon disks bonded to opposite sides of said core member, the outer surfaces of each of said disks being adapted to receive a magnetic recording material thereon.

5. Apparatus in accordance with claim 4, in which said core member has annular recesses on opposite surfaces to receive said silicon disks, the walls of said recesses serving to protect the relatively fragile silicon disks.

6. Apparatus in accordance with claim 7, in which said walls of said recesses extend above the surfaces of said disks.

7. Apparatus in accordance with claim 8, including a plurality of such structures clamped together, the extending walls of said recesses forming load bearing surfaces for adjacent structures and providing space between adjacent surfaces for access thereto by magnetic transducing means.

* * * * *